Dec. 29, 1942. E. R. BIFFINGER 2,306,773
POULTRY KILLING MACHINE
Filed Feb. 7, 1941 5 Sheets-Sheet 1

Inventor
Edwin R. Biffinger

By Clarence A. O'Brien

Attorney

Dec. 29, 1942.  E. R. BIFFINGER  2,306,773
POULTRY KILLING MACHINE
Filed Feb. 7, 1941  5 Sheets-Sheet 3

Inventor
Edwin R. Biffinger
By Clarence A. O'Brien
Attorney

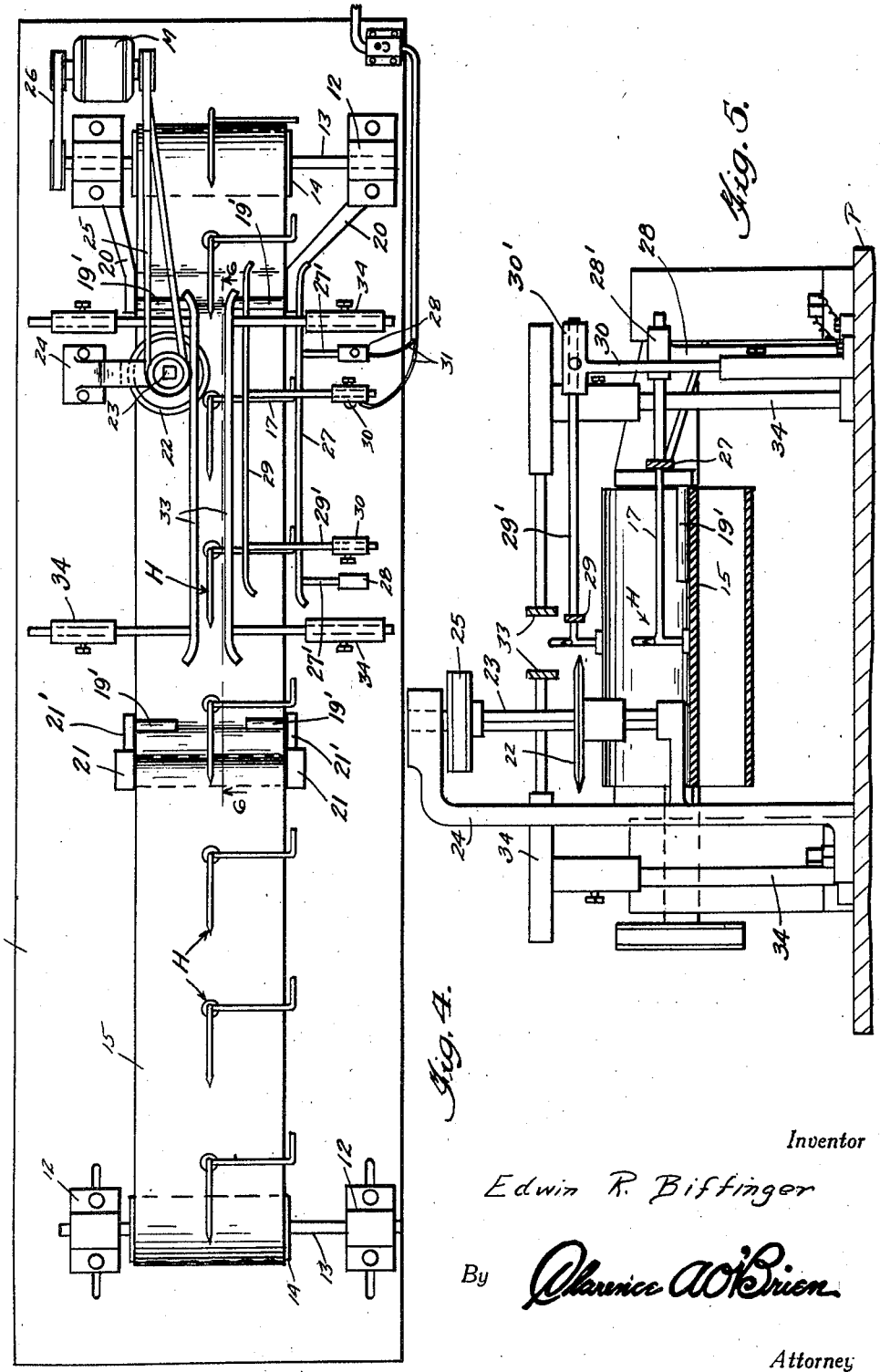

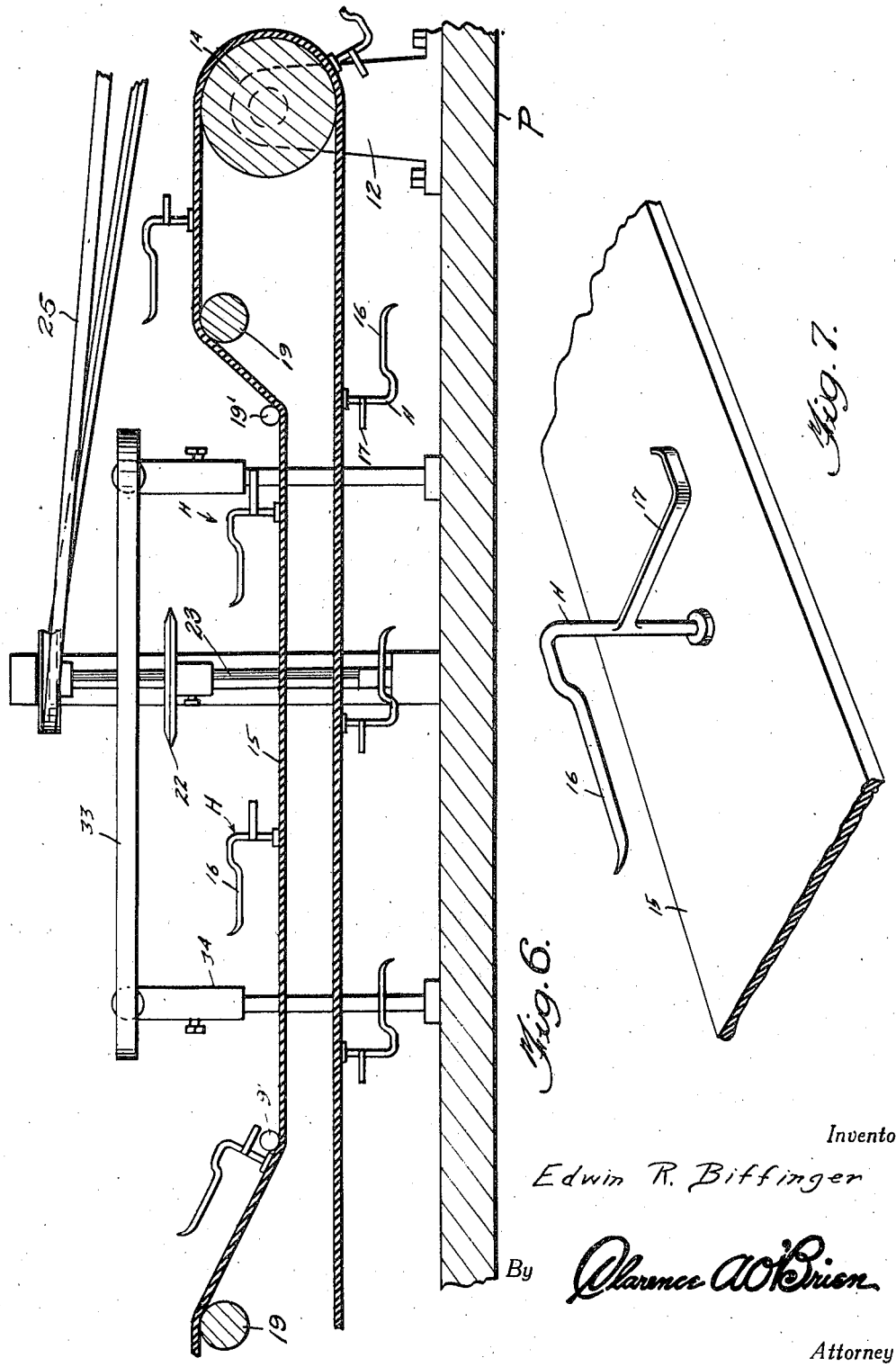

Patented Dec. 29, 1942

2,306,773

UNITED STATES PATENT OFFICE 2,306,773

POULTRY KILLING MACHINE

Edwin R. Biffinger, Fort Worth, Tex., assignor of one-half to J. B. Collier, Sr., Fort Worth, Tex.

Application February 7, 1941, Serial No. 377,897

4 Claims. (Cl. 17—11)

This invention relates to a poultry killing machine, the general object of the invention being to provide means for first stunning the poultry by passing an electric current through the head thereof just as one side of the neck of the poultry is being brought against a rotary knife which cuts the jugular vein, the electric current continuing to pass through the head after the poultry has passed the knife so that the poultry remains in a quiet state as it is being bled and there is no subsequent struggling or flapping of the wings, which reduces the bleeding time, and the electric current causes relaxation of the feather muscles so that the feathers can be quickly and easily removed.

Another object is to so construct and arrange the parts of the invention that the same can be used in a killing plant which includes a conveyor provided with means for holding the poultry by their feet.

Another object is to make the parts adjustable for poultry of different sizes and different kinds, and for adjusting the invention toward and away from the scalding machine, if such machine is used, and also to position the killing parts vertically to properly adjust them in relation to the conveying belt of the plant.

This invention also consists in certain other features of construction and in the combination and arrangement of the several parts to be hereinafter fully described, illustrated in the accompanying drawings, and specifically pointed out in the appended claims.

In describing the invention in detail, reference will be had to the accompanying drawings wherein like characters denote like or corresponding parts throughout the several views, and in which:

Figure 4 is a top plan view of Figure 3.

Figure 5 is an enlarged sectional view on the line 5—5 of Figure 3.

Figure 6 is an enlarged sectional view on the line 6—6 of Figure 4.

Figure 7 is an enlarged fragmentary perspective view showing how a hook member is carried by the belt of the killing machine.

Figure 1:
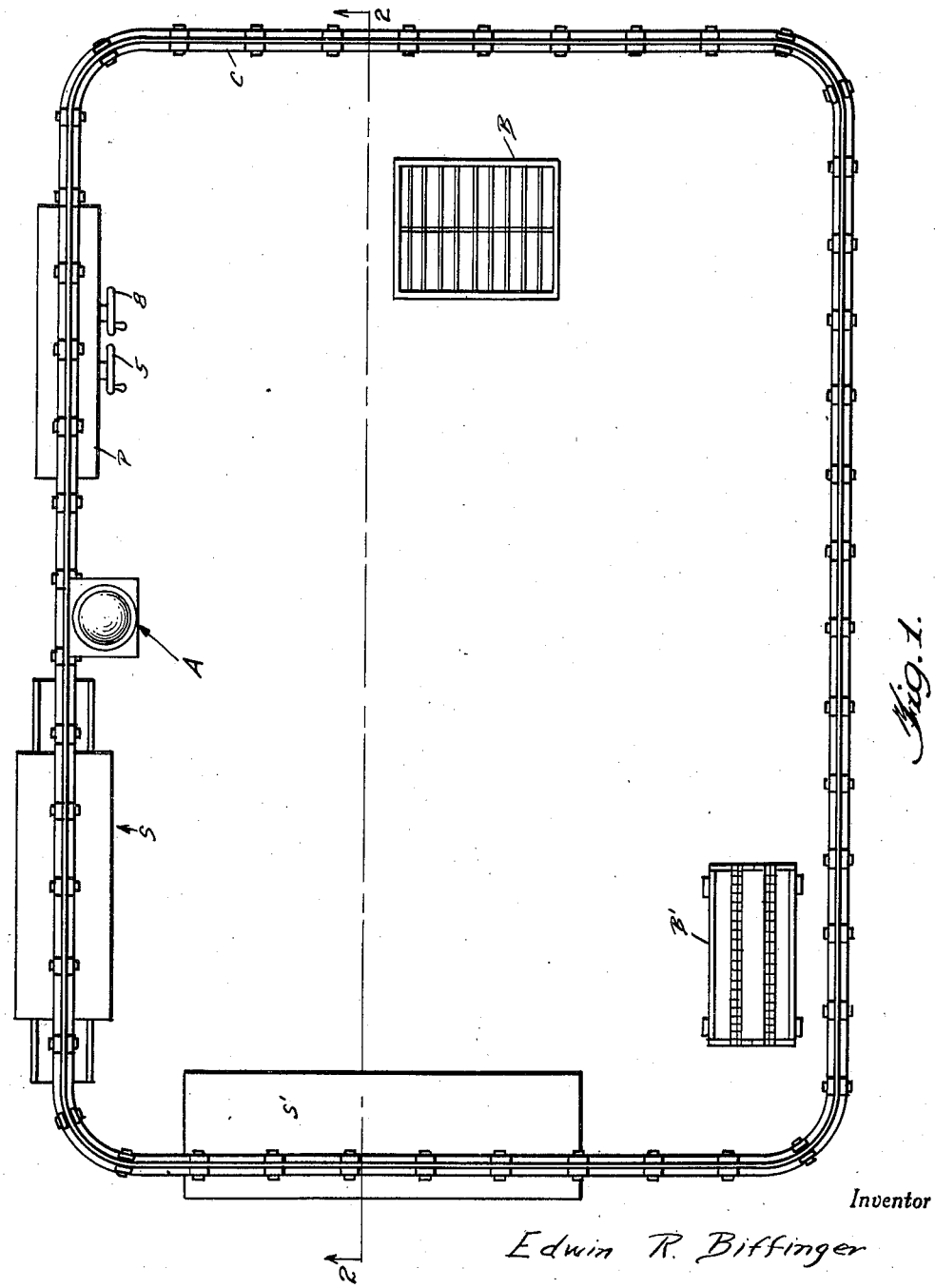
Figure 1 is a top plan view showing the invention in use in a poultry killing plant of conventional construction.

As is well known in conventional poultry killing plants, an overhead endless conveyor C, driven by a suitable motor or equivalent prime mover A, is suitably supported in the plant and has the shackles $c$ suspended therefrom by the chains $c'$, the shackles receiving the legs of the poultry to be killed. An operator takes the live poultry from the bin B and places them on the conveyor with the shackles gripping their legs and their bodies extending downwardly with their heads lowermost. The conveyor takes them to the scalding machine S and then the conveyor moves the poultry to the station S' where the feathers are removed by hand and finally the plucked poultry is removed from the conveyor by hand and placed in the receiving bin B' where the poultry is removed and stored. It is understood that between the points where the birds are placed on the conveyor and the scalding machine the birds are killed by hand.

My invention consists in providing means for killing the birds by machinery and automatically as they pass along with the conveyor toward the scalding machine and in carrying out the invention I provide a platform P, which is slidably arranged on a base 1 fastened to a standard 2 having the rack teeth 3 at one edge thereof. This standard passes through a vertically arranged pedestal 4, which is suitably supported on the floor of the plant under a portion of the conveyor. The platform can be adjusted toward and away from the conveyor through means of a hand wheel 5 attached to a shaft 6 journaled in the pedestal and having a toothed wheel 7 attached thereto for engaging the teeth 3 of the standard. Also, the platform P can be adjusted longitudinally toward and away from the scalding machine S, through means of a hand wheel 8 attached to a shaft 9 journaled in the pedestal and having a toothed wheel 10 attached thereto which passes through a slot in the base 1 and engages a rack bar 11 attached to the platform P, as shown more clearly in Figure 3.

Figure 2:
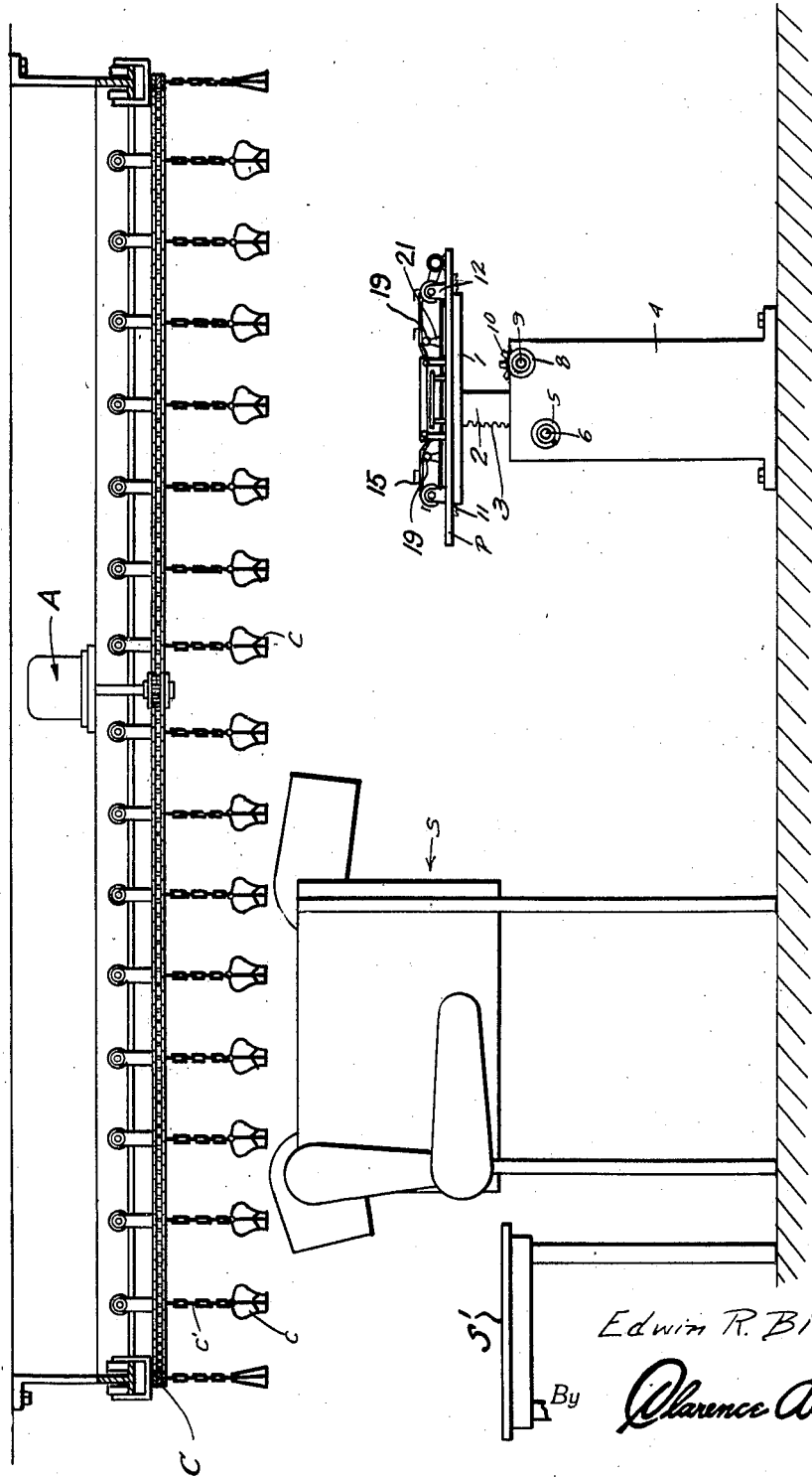
Figure 2 is an enlarged vertical sectional view taken on the line 2—2 of Figure 1.
Figure 3:
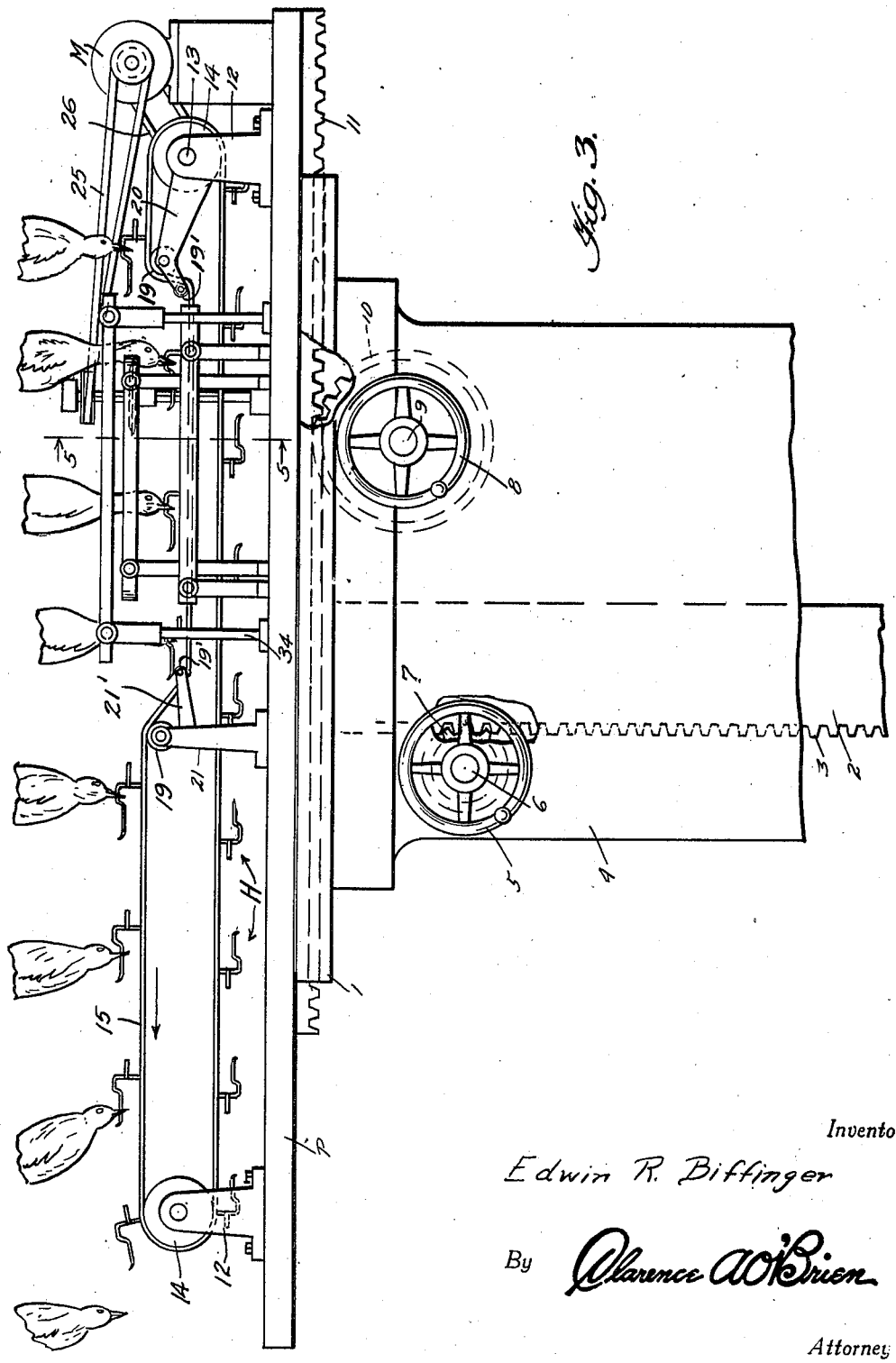
Figure 3 is an enlarged elevational view of the invention, with parts broken away.

The platform P carries the uprights 12 for the shafts 13 which carry the rollers 14, over which a belt 15 of rubber or the like passes. The parts are so arranged that the belt 15 is located under a portion of the conveyor C and said belt carries a plurality of hooks H each of which includes a long substantially straight beak 16 and a laterally extending L-shaped contact arm 17, the parts being constructed as shown more particularly in Figure 7. These hooks are passed through the bills of the poultry, by an operator, as the poultry is brought to the front end of the device by the conveyor C. Preferably the beak 16 is passed through the lower jaw of each bird, and this can be easily done, as this jaw is of V-shaped formation with an easily penetrable substance between the bones of the jaw. The device can be adjusted close enough to the conveyor C so that the necks of the birds will have plenty of slack in order to enable the operator to readily pass the hooks through the jaws. After a certain amount of movement toward the left, the belt 15 has its upper reach lowered for a portion of its length for stretching the necks of the birds as they are conveyed by the conveyor C over this lowered portion of the belt 15, as shown in Figures 2 and 3 taken together. As shown in Figures 3, 4, 5 and 6, the means for thus lowering a portion of the upper reach of the belt 15 comprises front and rear pairs of small rolls 19', the rolls of each pair being in longitudinal alignment but with the inner ends spaced apart to permit passage of the hooks H between such inner ends, and these small rollers are placed well below the horizontal plane of the rollers 14, and a larger roller 19 is placed in front of the front pair of rolls 19', and a similar roller 19 is placed in rear of the rear pair of rolls 19', but these rollers 19 extend entirely across the belt with the belt passing over them, and these rollers 19 have their upper portions lying in the same horizontal plane as the upper portions of the rollers 14. Thus it will be seen that the upper reach of the belt 15 passes from the upper portion of the front roller 14, over the roller 19 and then downwardly and forwardly under the front pair of rolls 19', after which the belt, after traveling a certain distance, passes under the rear pair of rolls 19' and then over the rear roller 19 to the rear roller 14. The front roller 19 is journaled in the arms 20 extending rearwardly from the front upright 12 and said arms have depending portions which slope downwardly and rearwardly and the front pair of rolls 19' are journaled in the extremities of these downwardly and rearwardly sloping portions of the arms 20, as shown in Figures 3, 4 and 5. The rear roller 19 is journaled in the uprights 21 and these uprights are provided with the forwardly extending arms 21', in the front ends of which are journaled the rear pair of rolls 19'.

After the necks of the birds have been stretched they are brought against a circular knife 22 which cuts one side of the neck so as to sever the jugular vein, but without cutting the windpipe. This knife is carried by a shaft 23 rotating in a support 24 carried by the platform and driven from a motor M through means of belts and pulleys, shown generally at 25, or in any other suitable manner, and this motor also drives the front shaft 13, as shown at 26 for moving the belt 15.

Just before the neck of each bird is engaged by the knife, an electric shock is given the bird by the passage of an electric current through the head thereof. This is done through means of a contact plate 27, carried by the rods 27' adjustably supported in horizontal tubular members 28' on the upper ends of the posts 28 carried by and insulated from the platform. Plate 27 is engaged by the short arm of the L-shaped part 17 of the hook H so that the current will pass from the plate 27 through the arm 17 of the hook H, through the bill and head of the bird and then the current will pass from the head to the plate 29 adjustably supported by the posts 30 carried by and insulated from the platform. This plate 29 is attached to the rods 29' adjustably held in the tubular members 30' on the upper ends of the posts 30 and I make each post of two parts, one part telescoping into the other part and the two parts being adjustably connected together. Conductors 31 connect some of the posts 28 and 30 to a power line (not shown).

Thus the birds are stunned by the passage of this electric current through their heads just before their jugular veins are cut and this keeps the birds from flapping their wings and otherwise struggling, and raising their heads and the feather muscles also become relaxed, so that the feathers will be readily removed when they reach the plucking point. After the birds have had their throats cut the hooks to which the heads of the birds are connected pass the rearmost set of rolls 19' so that the portion of the belt carrying the hooks moves upwardly, and thus the necks of the birds are slackened, and as the main conveyor belt C is traveling at approximately twice the speed of the belt 15, the bills of the birds will readily pass from the hooks H, as shown in Figure 3, so that the birds are automatically detached from the belt 15 of the killing device.

Before being engaged by the electric current and by the knife the heads of the birds pass between the pair of guard rails 33 adjustably supported by the uprights 34 on the platform, these guard rails holding the lower portions of the bodies of the birds against movement during the killing process. These guard rails, as well as the electric strips 27 and 29, are suitably arranged for adjustment to suit different sizes and kinds of poultry, and the electric strips can be made adjustable as to length so as to keep the current flowing through the head of a bird for the correct length of time.

Thus it will be seen that I have provided a comparatively simple form of machine for automatically killing poultry after being placed on the conveyor chain of a killing plant, with the machine first stunning the bird by the flow of electricity simply through the head of each bird and then cutting the throat from one side to sever the jugular vein without cutting the windpipe. This prevents any blood from flowing back into the body of the bird, as will occur if the bird struggles, and its head is not firmly held down, and it also prevents water entering the windpipe in the scalding machine as it would if the windpipe were severed. By stretching the neck of each bird as it is being killed, the operator can readily place the hook through the bill of the bird as it comes over the killing belt, and the bill of the bird is automatically released from the hook of the belt by the greater speed of the main conveyor over that of the belt 15.

As is well known, the outer skin on the legs of poultry prevents the passage of electric current, so that there is but little danger of the current passing through the body of the bird, and thus charging the chain of the main conveyor. However, if desired, the shackles c can be insulated from the conveyor to positively prevent any passage of current from the killing machine to the main conveyor.

It is thought from the foregoing description that the advantages and novel features of the invention will be readily apparent.

It is to be understood that changes may be made in the construction and in the combination and arrangement of the several parts, provided that such changes fall within the scope of the appended claims.

Having described the invention, what is claimed as new is:

1. A poultry killing machine including a conveyor for conveying the birds in a position suspended by their legs, means engaging the bills of the birds for holding the heads lowermost, means for passing electric current through the heads of the birds, a knife against which the necks of the birds are brought by the conveyor means for severing the jugular vein and means for stretching the necks before and during contact of the necks with the knife.

2. In a poultry killing apparatus including a conveyor with means for attaching the feet of the poultry to the conveyor with the body suspended from the conveyor, an endless belt supported for movement under the conveyor, hooks carried by the belt for engaging portions of the bills of the birds, means for lowering a portion of the upper reach of the belt for stretching the necks of the birds, a rotary knife, and means for rotating the same, one side of the neck of each bird being brought against the knife as the birds are moved along by the conveyor and with the belt, the necks engaging the knife as the necks are stretched by the low part of the belt.

3. In a poultry killing apparatus including a conveyor from which the birds are suspended, an endless belt, means for supporting the same under the conveyor, means for causing a portion of the upper reach of the belt to dip, hooks carried by the belt for engaging portions of the bills of the birds, the dipping part of the belt causing the hooks to stretch the necks of the birds, a rotary knife for engaging the necks of the birds after they have been stretched and as the birds are moved along with the conveyor and the belt, an elongated contact plate, an arm on each hook for engaging the contact plate for electrically connecting the beak of a bird with the plate, said plate being engaged by a part of the hook just before the neck of the bird engages the knife, and a second contact plate engaged by the head of the bird just before the neck of the bird engages the knife.

4. In a poultry killing apparatus including a conveyor from which the birds are suspended, a platform, means for adjusting the platform vertically toward and away from a part of the conveyor, means for adjusting the platform longitudinally, an endless belt supported by the platform, hooks carried by the belt for engaging portions of the beaks of birds suspended from the conveyor, means for causing a portion of the upper reach of the belt to dip for causing the necks of the birds to be stretched as they pass over this portion of the belt, a rotary knife against which the necks of the birds are brought by the conveyor means, positive and negative longitudinally extending contact strips electrically connected in a circuit and supported by the platform, one strip being engaged by the heads of the birds just before they are engaged by the knife, contact arms on the hooks for engaging the other contact strip, said strips causing electric current to pass through the heads just before and during the engagement of the necks of the birds by the knife, and means for moving the belt at a slower speed than the conveyor for causing the beaks of the birds to pass off the hooks before the hooks reach the rear end of travel of the upper reach of the conveyor belt.

EDWIN R. BIFFINGER.